(12) United States Patent
Kim

(10) Patent No.: US 12,092,725 B2
(45) Date of Patent: Sep. 17, 2024

(54) METHOD AND APPARATUS FOR DETERMINING OBJECT STATE

(71) Applicant: Samsung Electronics Co., Ltd., Suwon-si (KR)

(72) Inventor: Donghan Kim, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 650 days.

(21) Appl. No.: 16/281,338

(22) Filed: Feb. 21, 2019

(65) Prior Publication Data
US 2020/0103517 A1 Apr. 2, 2020

(30) Foreign Application Priority Data

Sep. 27, 2018 (KR) .......................... 10-2018-0114724

(51) Int. Cl.
*G01S 13/60* (2006.01)
*G01S 13/58* (2006.01)
(Continued)

(52) U.S. Cl.
CPC ............ *G01S 13/60* (2013.01); *G01S 13/582* (2013.01); *G01S 13/865* (2013.01);
(Continued)

(58) Field of Classification Search
CPC ...... G01S 13/60; G01S 13/582; G01S 13/865; G01S 13/867; G01S 17/58
See application file for complete search history.

(56) References Cited

U.S. PATENT DOCUMENTS

| | | | | |
|---|---|---|---|---|
| 8,665,137 B2 * | 3/2014 | Wintermantel | ....... | G01S 13/343 342/188 |
| 2009/0021421 A1 * | 1/2009 | Wakayama | ............. | G01S 7/354 342/175 |

(Continued)

FOREIGN PATENT DOCUMENTS

| | | | | |
|---|---|---|---|---|
| DE | 102011077186 A1 * | 2/2012 | ............... | G01S 3/38 |
| JP | 3026688 B2 | 3/2000 | | |

(Continued)

OTHER PUBLICATIONS

Ali, Faiza, et al., "Detection of Weak Moving Targets Based on 2-D Range-Doppler FMCW Radar Fourier Processing." *German Microwave Conference Digest of Papers.* IEEE, 2010 (pp. 214-217).

(Continued)

*Primary Examiner* — Vladimir Magloire
*Assistant Examiner* — Ismaaeel A. Siddiquee
(74) *Attorney, Agent, or Firm* — NSIP Law

(57) ABSTRACT

A method and apparatus for determining a velocity and a direction of arrival (DoA) of an object includes transmitting a signal using a determined signal transmission order of transmission antennas, receiving a reflected signal with respect to the transmitted signal using reception antennas, generating virtual antennas based on an arrangement of the transmission antennas and an arrangement of the reception antennas, generating virtual signals with respect to the virtual antennas based on the reflected signal and the virtual antennas, calculating a first estimated phase and a second estimated phase that are different from each other based on the virtual signals, and determining the velocity and the DoA of the object concurrently based on the first estimated phase and the second estimated phase without performing additional processing.

22 Claims, 20 Drawing Sheets

(51) Int. Cl.
*G01S 13/86* (2006.01)
*G01S 17/58* (2006.01)
*G01S 13/34* (2006.01)
*G01S 13/42* (2006.01)
*G01S 13/931* (2020.01)

(52) U.S. Cl.
CPC ............ *G01S 13/867* (2013.01); *G01S 17/58* (2013.01); *G01S 13/343* (2013.01); *G01S 13/42* (2013.01); *G01S 13/931* (2013.01)

(56) References Cited

U.S. PATENT DOCUMENTS

| | | | | |
|---|---|---|---|---|
| 2009/0121916 | A1* | 5/2009 | Miyake | G01S 13/931 342/147 |
| 2011/0304508 | A1* | 12/2011 | Remez | G01S 3/48 342/442 |
| 2015/0229033 | A1* | 8/2015 | Choi | H01Q 3/2611 343/893 |
| 2015/0295628 | A1* | 10/2015 | Rambach | G01S 7/282 370/337 |
| 2016/0091595 | A1* | 3/2016 | Alcalde | G01S 13/4454 342/175 |
| 2017/0276769 | A1* | 9/2017 | Kishigami | G01S 7/0234 |
| 2017/0285159 | A1* | 10/2017 | Kuo | H01Q 21/08 |
| 2018/0011170 | A1 | 1/2018 | Rao et al. | |
| 2018/0052220 | A1* | 2/2018 | Fuchs | G01S 13/5244 |
| 2018/0128916 | A1* | 5/2018 | Bialer | G01S 13/87 |
| 2018/0136324 | A1* | 5/2018 | Klotzbuecher | G01S 7/354 |
| 2018/0172813 | A1* | 6/2018 | Rao | G01S 13/343 |
| 2019/0353751 | A1* | 11/2019 | Raphaeli | G01S 7/292 |
| 2020/0373681 | A1* | 11/2020 | Rojanski | G01S 7/025 |

FOREIGN PATENT DOCUMENTS

| | | |
|---|---|---|
| KR | 10-1553877 B1 | 9/2015 |
| KR | 10-2017-0058822 A | 5/2017 |
| KR | 10-2017-0115257 A | 10/2017 |

OTHER PUBLICATIONS

Schmid, Christian M., et al. "Motion Compensation and Efficient Array Design for TDMA FMCW MIMO Radar Systems", *2012 6th European Conference on Antennas and Propagation (EUCAP). IEEE*, Mar. 2012 (pp. 1746-1750).

Korean Office Action issued on Nov. 7, 2023 in corresponding Korean Patent Application No. 10-2018-0114724 (3 pages in English, 5 pages in Korean).

Bechter, Jonathan, et al. "Compensation of motion-induced phase errors in TDM MIMO radars." *IEEE Microwave and Wireless Components Letters* vol. 27. Issue 12 (2017). pp 1-4.

* cited by examiner

FIG. 3
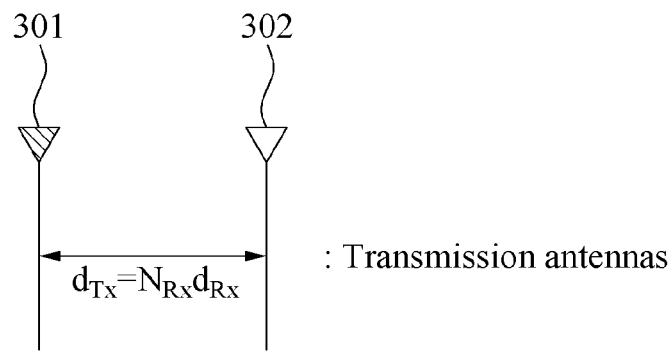
: Transmission antennas
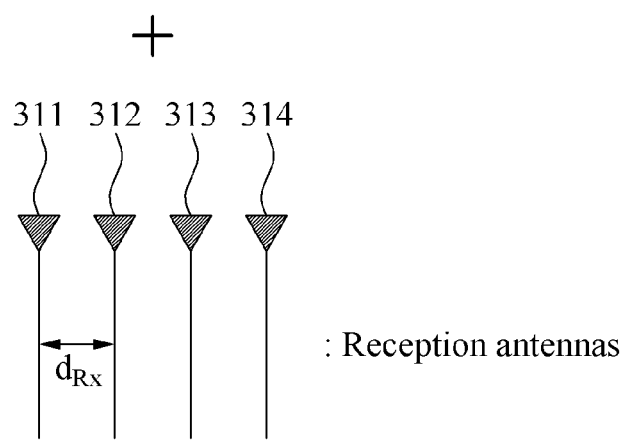
: Reception antennas
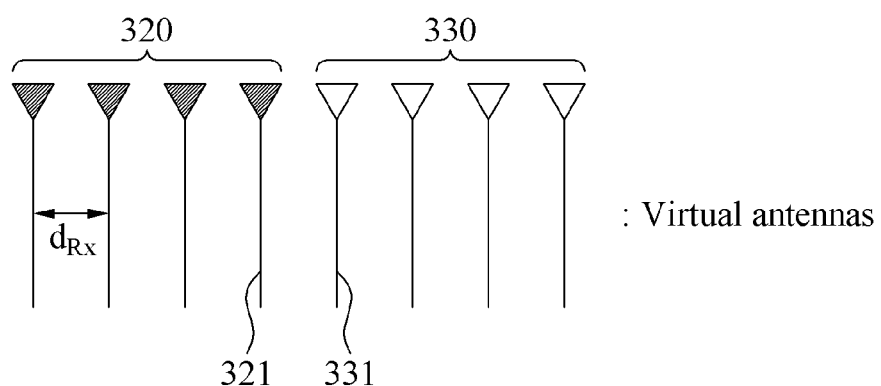
: Virtual antennas

METHOD AND APPARATUS FOR DETERMINING OBJECT STATE

CROSS-REFERENCE TO RELATED APPLICATIONS

This application claims the benefit under 35 USC § 119(a) of Korean Patent Application No. 10-2018-0114724 filed on Sep. 27, 2018 in the Korean Intellectual Property Office, the entire disclosure of which is incorporated herein by reference for all purposes.

BACKGROUND

1. Field

The following description relates to determining a state of an object, and determining a direction of arrival (DoA) and a velocity of a moving object.

2. Description of Related Art

An advanced driver assistance system (ADAS) is an assistance system to improve safety and convenience of a driver and to assist in avoiding dangerous situations using sensors mounted in or out of a vehicle. With the reinforcement of driving regulations for motorized vehicles all over the globe and the commercialization of autonomous vehicles, the significance of systems, such as ADAS, has increased.

The sensors used for ADAS include, for example, a camera, an infrared sensor, an ultrasonic sensor, a light detection and ranging (lidar), and a radar. Among these sensors, the radar stably measures an object in a vicinity of the vehicle irrespective of a surrounding environment such as weather, in comparison to an optical sensor. Further, unlike the camera or the ultrasonic sensor, a single radar measures both an object in a short range and an object in a long range. When compared to the lidar, the cost of radar is low, while providing the same performance. Thus, the radar is important for the ADAS.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an method for determining a state of an object, the method including transmitting a signal using a determined signal transmission order of transmission antennas, receiving a reflected signal with respect to the transmitted signal using reception antennas, generating virtual antennas based on an arrangement of the transmission antennas and an arrangement of the reception antennas, generating virtual signals with respect to the virtual antennas based on the reflected signal and the virtual antennas, calculating a first estimated phase and a second estimated phase that are different from each other based on the virtual signals, and determining any one or any combination of a direction of arrival (DoA) and a velocity of the object based on the first estimated phase and the second estimated phase.

The transmitted signal may be a frequency modulated continuous wave (FMCW) signal or a chirp signal.

The method may include determining whether the object exists based on the reflected signal, wherein the first estimated phase and the second estimated phase may be calculated in response to the object existing.

The determining of whether the object exists may include performing range-Doppler processing on the reflected signal, and determining whether the object exists by applying a constant false alarm rate (CFAR) detection scheme to the range-Doppler processed reflected signal.

The generating of the virtual antennas may include arranging the virtual antennas based on a distance between the respective transmission antennas and a distance between the respective reception antennas, and generating the virtual antennas based on the arranged virtual antennas.

The determined signal transmission order may be determined based on generating a plurality of transmission antenna pairs by grouping the transmission antennas into pairs, determining a target transmission antenna pair having an even index or an odd index from among the plurality of transmission antenna pairs, and switching a transmission order of a first transmission antenna and a second transmission antenna in the target transmission antenna pair.

The calculating may include calculating the first estimated phase based on virtual signals with respect to a first virtual antenna pair corresponding to a transmission antenna pair that transmits signals in a forward direction, and calculating the second estimated phase based on virtual signals with respect to a second virtual antenna pair corresponding to the target transmission antenna pair that transmits signals in a backward direction.

The calculating of the first estimated phase may include generating differential signals with respect to a plurality of first virtual antenna pairs, and calculating the first estimated phase based on the differential signals.

The DoA of the object may be based on a sum of the first estimated phase and the second estimated phase.

The velocity of the object may be based on a subtraction of the first estimated phase and the second estimated phase.

The determining of the velocity of the object may include calculating an amount of a Doppler frequency shift based on the subtraction of the first estimated phase and the second estimated phase, and calculating the velocity of the object based on the amount of the Doppler frequency shift.

In another general aspect, there is provided a device to determine a state of an object, the device including a processor configured to transmit a signal using a signal transmission order of transmission antennas, receive a reflected signal with respect to the transmitted signal using reception antennas, generate virtual antennas based on an arrangement of the transmission antennas and an arrangement of the reception antennas, generate virtual signals with respect to the virtual antennas based on the reflected signal and the virtual antennas, calculate a first estimated phase and a second estimated phase that are different from each other based on the virtual signals, and determine any one or any combination of a direction of arrival (DoA) and a velocity of the object based on the first estimated phase and the second estimated phase.

The processor may be further configured to determine whether the object exists based on the reflected signal, wherein the first estimated phase and the second estimated phase may be calculated in response to the object existing.

The processor may be configured to arrange the virtual antennas based on a distance between the respective transmission antennas and a distance between the respective reception antennas, and generate the virtual antennas based on the arranged the virtual antennas.

The processor may be configured to determine the signal transmission order based on generating a plurality of transmission antenna pairs by grouping the transmission antennas into pairs, determining a target transmission antenna pair having an even index or an odd index from among the plurality of transmission antenna pairs, and switching a transmission order of a first transmission antenna and a second transmission antenna in the target transmission antenna pair.

The device may include a memory storing instructions that, when executed, configures the processor to determine any one or any combination of the DoA and the velocity of the object.

In another general aspect, there is provided an electronic device, including a radar including transmission antennas that transmit a signal and reception antennas that receive a signal, and a processor configured to transmit a signal using a signal transmission order for the transmission antennas, receive a reflected signal from an object with respect to the transmitted signal using the reception antennas, generate virtual antennas based on an arrangement of the plurality of transmission antennas and an arrangement of the plurality of reception antennas, generate virtual signals with respect to the virtual antennas based on the reflected signal and the virtual antennas, calculate a first estimated phase and a second estimated phase that are different from each other based on the virtual signals, and determine any one or any combination of a direction of arrival (DoA) and a velocity of the object based on the first estimated phase and the second estimated phase.

Other features and aspects will be apparent from the following detailed description, the drawings, and the claims.

BRIEF DESCRIPTION OF THE DRAWINGS

FIG. 3 illustrates an example of transmission antennas, reception antennas, and virtual antennas.

Figure 1:
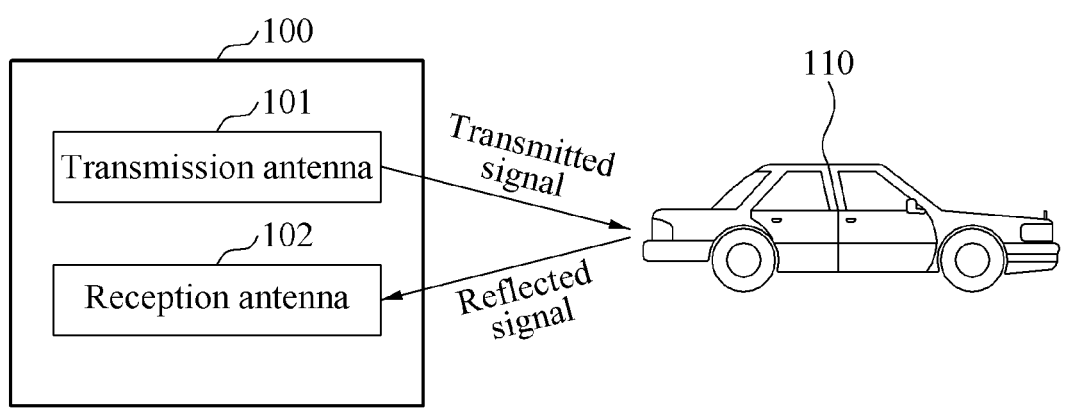
FIG. 1 illustrates an example of a method of detecting an object using a radar.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

When describing the embodiments with reference to the accompanying drawings, like reference numerals refer to like constituent elements and a repeated description related thereto will be omitted. When it is determined detailed description related to a related known function or configuration may make the description redundant, the detailed description will be omitted.

FIG. 1 illustrates an example of a method of detecting an object using a radar.

An object 110 positioned in a vicinity of an electronic device may be detected by detecting a signal reflected by the object 110 when a signal is transmitted from a radar 100 of the electronic device toward the object 110. In an example, a transmission antenna 101 of the radar 100 transmits a signal toward the vicinity of the electronic device to detect an object, and a reception antenna 102 of the radar 100 receives a signal reflected by the object 110 and calculates a distance between the electronic device and the object 110 by calculating a time of flight (ToF).

To distinguish the signal reflected by the object 110 from noise or interference signals, the radar 100 uses a signal modulated with a code as the transmitted signal. If the signal received by the radar 100 corresponds to the transmitted signal, an object distance determining apparatus regards the received signal as the reflected signal. If the signal received by the radar 100 does not correspond to the transmitted signal, the object distance determining apparatus regards the received signal as a noise signal or an interference signal.

In an example, the transmitted signal is output continuously. For example, the transmitted signal is a frequency modulated continuous waveform (FMCW) signal. The FMCW signal is a signal frequency-modulated based on 77 gigahertz (GHz). A 77-GHz millimeter wave is a signal which shows a number of changes within a predetermined time and thus, provides a relatively high range resolution.

Figure 2:
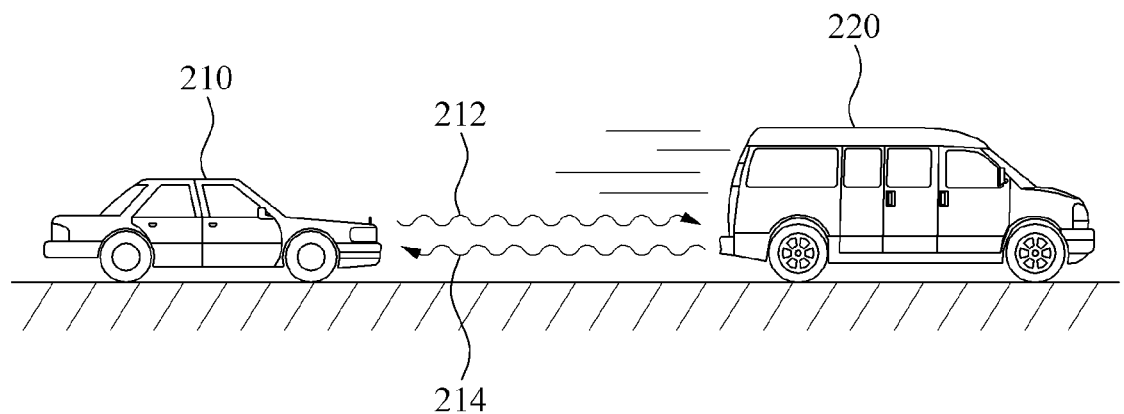
FIG. 2 illustrates an example of a method of detecting a moving vehicle using a radar.

FIG. 2 illustrates an example of a method of detecting a moving vehicle using a radar.

To measure a direction of arrival (DoA) and a velocity of a moving vehicle 220, a radar included in a vehicle 210 continuously transmits a plurality of signals 212 and calculates a time difference between reflected signals 214 that are received. In an example in which the vehicle 220 and the vehicle 210 are travelling at different velocities, a phase of a first reflected signal with respect to a first transmitted signal is different from a phase of a second reflected signal with respect to a second transmitted signal due to the Doppler effect. That is, a phase of the reflected signal is shifted nonlinearly as vehicle 220 moves. If such a nonlinear phase shift occurs, there may be an error in a detected DoA of the vehicle 220.

FIG. 3 illustrates an example of transmission antennas, reception antennas, and virtual antennas.

In an example in which the radar 100 is a multiple-input and multiple-output (MIMO) system including a plurality of transmission antennas 301 and 302 and a plurality of reception antennas 311, 312, 313, and 314, virtual antennas 320 and 330 are generated based on the plurality of transmission antennas 301 and 302 and the plurality of reception antennas 311, 312, 313, and 314, In an example, a DoA and a velocity of an object are measured based on the virtual antennas 320 and 330.

Using virtual antennas 320 and 330 can produce an effect similar to that of increasing the number of reception antennas. When the virtual antennas 320 and 330 are used, a resolution of the radar improves as the size of apertures of the transmission antennas increases. Thus, the resolution may improve using fewer transmission antennas.

For example, a first reflected signal with respect to a first signal transmitted by a first transmission antenna 301 is received by first virtual antennas 320, and a second reflected signal with respect to a second signal transmitted by a second transmission antenna 302 is received by second virtual antennas 330.

A phase of the reflected signal received by the first virtual antennas 320 is $[1, e^{j\pi \sin(\theta)}, e^{j2\pi \sin(\theta)}, e^{j3\pi \sin(\theta)}]$, and a phase of the reflected signal received by the second virtual antennas 330 is $[e^{j4\pi \sin(\theta)+j2\pi f_D T_{chirp}}, e^{j5\pi \sin(\theta)+j2\pi f_D T_{chirp}}, e^{j6\pi \sin(\theta)+j2\pi f_D T_{chirp}}, e^{j7\pi \sin(\theta)+j2\pi f_D T_{chirp}}]$. In the above example, it is assumed a distance between the antennas is $\lambda/2$. An additional phase shift of $2\pi f_D T_{chirp}$ appears between phases of signals received by a virtual antenna 321 and a virtual antenna 331. $2\pi f_D T_{chirp}$ denotes a phase shift occurring as an object moves.

$$f_D = 2\frac{v}{\lambda}\cos(\theta)$$

denotes an amount of a Doppler frequency shift occurring based on a velocity v of the object. $\lambda$ denotes a wavelength of a transmitted signal. When a nonlinear phase shift like $2\pi f_D T_{chirp}$ appears, a DoA of the object estimated by the radar may indicate an incorrect DoA.

A method of determining the DoA and the velocity of the object in view of a Doppler frequency shift will be described with reference to FIGS. 4 through 20.

Figure 4:
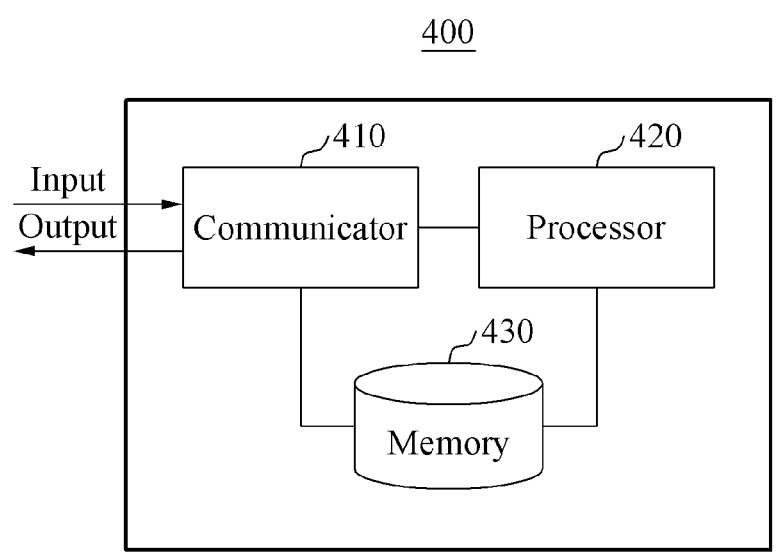
FIG. 4 illustrates an example of an electronic device to determine a state of an object.

FIG. 4 illustrates an example of a configuration of an electronic device to determine a state of an object.

Referring to FIG. 4, an electronic device 400 includes a communicator 410, a processor 420, and a memory 430. In an example, the electronic device 400 is included in a vehicle. For example, the electronic device 400 is an electronic control unit (ECU) of the vehicle. In another example, the electronic device 400 is connected to an ECU of the vehicle. The vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an unmanned aerial vehicle, an electric vehicle (EV), a hybrid vehicle, or a drone. In another example, electronic device 400 is included in various other devices, such as, for example, a walking assistance device, a wearable device, a security device, a robot, a mobile terminal, and various Internet of Things (IoT) devices.

The electronic device 400 may further include a radar (not shown) as described with reference to FIGS. 1 through 3. The radar transmits an FMCW signal using transmission antennas and receives a reflected signal of the FMCW signal using reception antennas.

The communicator 410 is connected to the processor 420, the memory 430, and the radar to transmit and receive data. In an example, the communicator 410 is connected to an external device to transmit and receive data.

In an example, the communicator 410 is implemented by a circuitry in the electronic device 400. For example, the communicator 410 includes an internal bus and an external bus. In another example, the communicator 410 is an element which connects the electronic device 400 to the external device. In an example, the communicator 410 is an interface. The communicator 410 receives data from the external device and transmits the data to the processor 420 and the memory 430.

In an example in which the electronic device 400 does not include the radar, the communicator 410 receives data obtained from a radar.

The processor 420 processes the data received by the communicator 410 and data stored in the memory 430. The "processor" is a data processing device implemented by hardware including a circuit having a physical structure to perform desired operations. For example, the desired operations include instructions or codes included in a program. For example, the hardware-implemented data processing device includes a microprocessor, a central processing unit (CPU), a processor core, a multi-core processor, a multiprocessor, an application-specific integrated circuit (ASIC), and a field programmable gate array (FPGA). Further details regarding the processor 420 is provided below.

The processor 420 executes computer-readable codes, for example, software, stored in a memory, for example, the memory 430, and instructions triggered by the processor 420.

The memory 430 stores the data received by the communicator 410 and the data processed by the processor 420. For example, the memory 430 stores the program. In an example, the stored program is a set of syntaxes coded to determine a DoA and a velocity of an object and executable by the processor 420.

The memory 430 includes at least one volatile memory, non-volatile memory, random access memory (RAM), flash memory, hard disk drive, and optical disk drive. Further details regarding the memory 430 are provided below.

The memory 430 stores a command set, for example, software, to operate the electronic device 400. The command set to operate the electronic device 400 is executed by the processor 420.

The communicator 410, the processor 420, the memory 430, and the radar will be described further below with reference to FIGS. 5 through 18.

Figure 5:
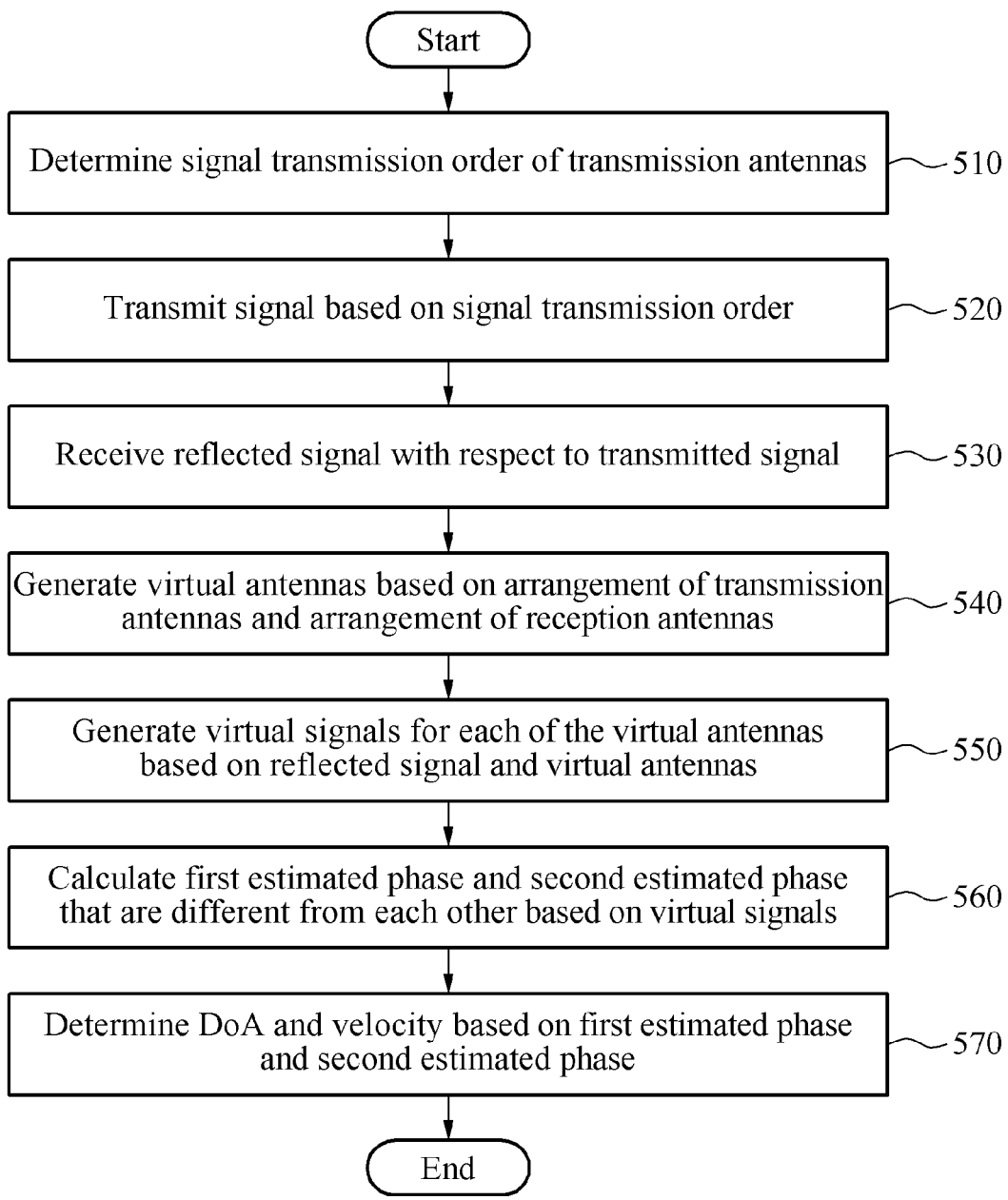
FIG. 5 illustrates an example of a method of determining a state of an object.

FIG. 5 illustrates an example of a method of determining a state of an object. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. In an example, operations 510 through 570 of FIG. 5 are performed by the electronic device 400 of FIG. 4. One or more blocks of FIG. 5, and combinations of the blocks, can be implemented by special purpose hardware-based computer that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

In operation 510, the electronic device 400 determines a signal transmission order of transmission antennas of a radar. In an example, a time division scheme is used to transmit a signal using the transmission antennas. In the time division scheme, one transmission antenna monopolizes a time period.

Phases of virtual signals generated by virtual antennas may change based on the order of signal transmission of the transmission antennas. Elements of the virtual signals appearing due to the Doppler effect are offset depending on a scheme of processing the virtual signals.

An example of determining the signal transmission order of the transmission antennas so that elements of the virtual signals appearing due to the Doppler effect are offset will be described below with reference to FIGS. 6 and 7.

In operation 520, the electronic device 400 transmits a signal using the transmission antennas of the radar based on the signal transmission order.

In operation 530, the electronic device 400 receives a reflected signal with respect to the transmitted signal using reception antennas of the radar.

In operation 540, the electronic device 400 generates virtual antennas based on an arrangement of the transmission antennas and an arrangement of the reception antennas. In an example, the virtual antennas are generated in advance before operations 510 through 530 are performed. In an example, a scheme of disposing the virtual antennas is determined based on a distance between the transmission antennas and a distance between the reception antennas. In an example, to generate the virtual antennas, an interleaved scheme or a serialized scheme is used. In an example, the virtual antennas are generated based on the determined scheme. Virtual antennas generated using the interleaved scheme will be described with reference to FIG. 8, and virtual antennas generated using the serialized scheme will be described with reference to FIG. 9.

In operation 550, the electronic device 400 generates virtual signals for each of the virtual antennas based on the reflected signal and the virtual antennas. A description of the virtual signals is similar to the description of the reflected signal received by the first virtual antennas 320 and the reflected signal received by the second virtual antennas 330 provided with reference to FIG. 3. However, when the signal transmission order changes, the virtual signals of the virtual antennas also change.

In operation 560, the electronic device 400 calculates a first estimated phase and a second estimated phase which are different from each other based on the virtual signals with respect to the virtual antennas. An example of calculating the first estimated phase and the second estimated phase will be described further with reference to FIGS. 10 through 14.

In operation 570, the electronic device 400 determines a state of an object based on the first estimated phase and the second estimated phase. In an example the state of the object includes any one or any combination of a DoA and a velocity of the object. An example of determining the DoA and the velocity of the object will be described further with reference to FIGS. 15 and 16. In an example, the DoA of the object and the velocity of the object may be determined concurrently without performing an additional processing process.

Figure 6:
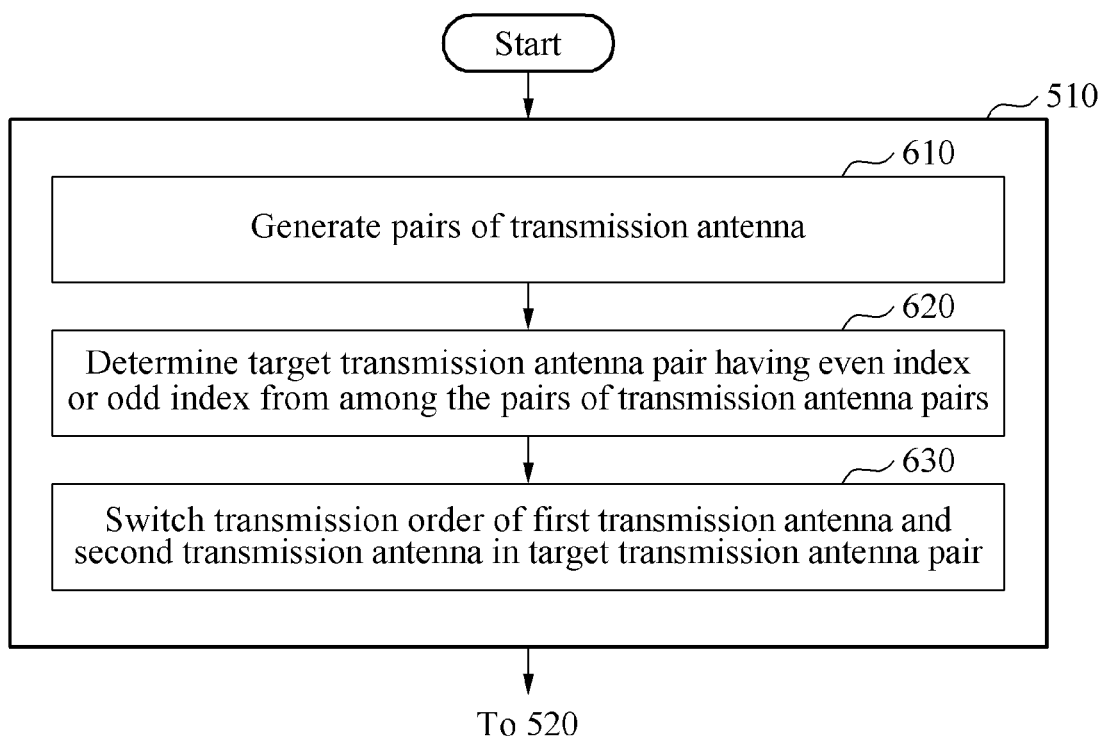
FIG. 6 illustrates an example of determining a signal transmission order of transmission antennas.

FIG. 6 illustrates an example of determining a signal transmission order of transmission antennas. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

Referring to FIG. 6, operation 510 of FIG. 5 includes operations 610, 620, and 630.

In operation 610, the electronic device 400 generates a plurality of transmission antenna pairs by grouping the transmission antennas into pairs. For example, neighboring transmission antennas are generated as a single pair. An index is assigned to a generated transmission antenna pair. For example, an index "0" is assigned to a leftmost transmission antenna pair, and an index "1" is assigned to a transmission antenna pair on the right side thereof. Hereinafter, an example of assigning an index "0" to a leftmost transmission antenna pair will be described. However, a scheme of assigning an index may change without departing from the spirit and scope of the illustrative examples described.

In operation 620, the electronic device 400 determines at least one target transmission antenna pair having an even index or an odd index from among the plurality of transmission antenna pairs. The index "0" is regarded as an even index. In an example in which there are indices "0" through "7", transmission antenna pairs having indices "0", "2", "4", and "6" are determined to be target transmission antenna pairs.

In operation 630, the electronic device 400 switches a transmission order of a first transmission antenna and a second transmission antenna in the target transmission antenna pair. For example, if a forward direction is defined as a direction from left to right, a backward direction in which the transmission order is switched is defined as a direction from right to left. In this example, in the target transmission antenna pair, the second transmission antenna positioned relatively on the right side has a priority in the transmission order over the first transmission antenna positioned relatively on the left side. That is, the second transmission antenna transmits a signal first, and then the first transmission antenna transmits a signal.

A transmission order of transmission antennas in a transmission antenna pair, other than the target transmission antenna pair, is the forward direction.

Figure 7:
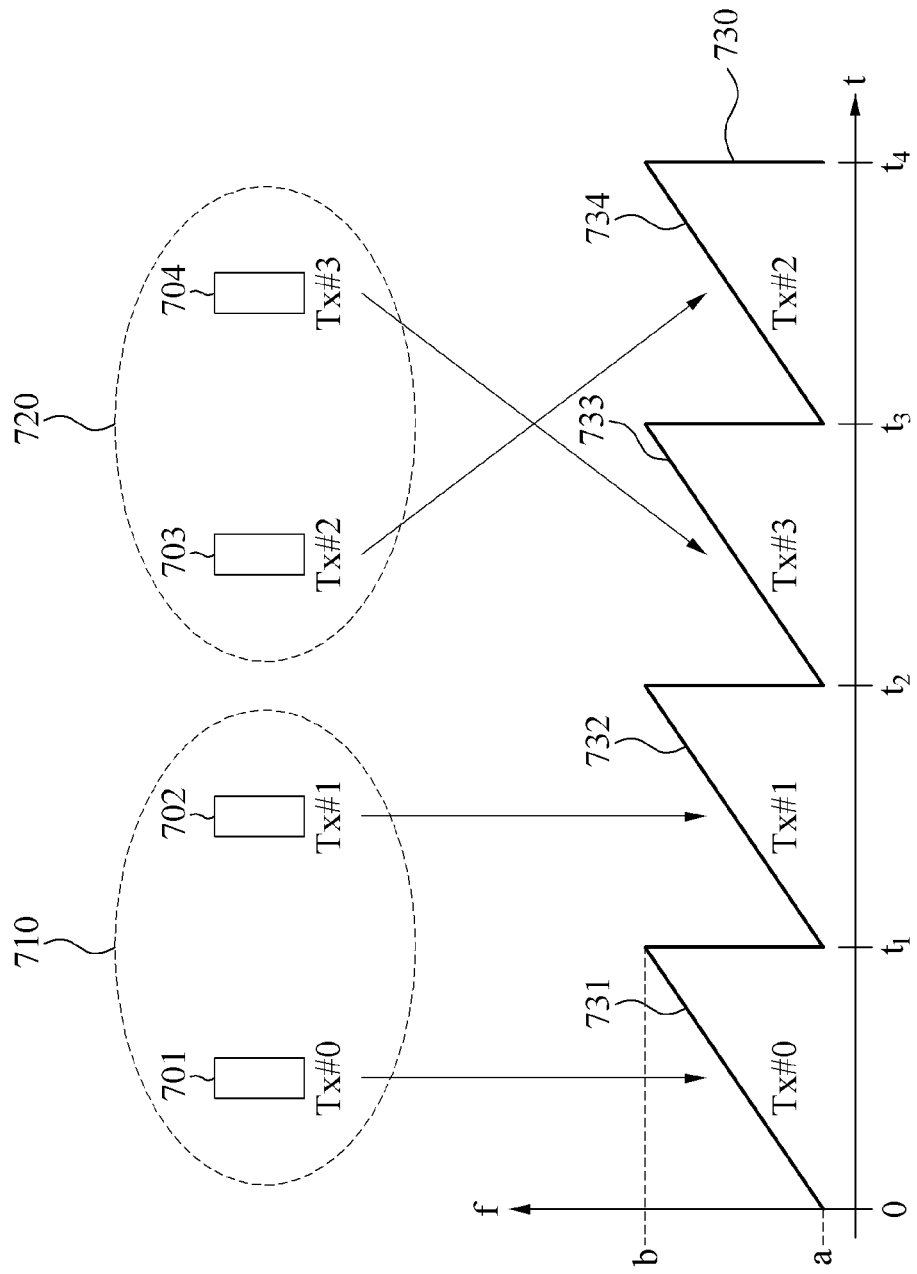
FIG. 7 illustrates an example of a signal transmitted based on a signal transmission order.

FIG. 7 illustrates an example of a signal transmitted based on a signal transmission order.

A first transmission antenna pair 710 and a second transmission antenna pair 720 are generated based on transmission antennas 701, 702, 703, and 704. An index of the first transmission antenna pair 710 is "0", an index of the second transmission antenna pair 720 is "1", and the second transmission antenna pair 720 having an odd index is determined to be a target transmission antenna pair.

A signal transmission order of a first transmission antenna 701 and a second transmission antenna 702 in the first transmission antenna pair 710 is determined to be a forward direction, and a signal transmission order of a third transmission antenna 703 and a fourth transmission antenna 704 in the second transmission antenna pair 720 is determined to be a backward direction. An overall signal transmission order is determined to be an order of the first transmission antenna 701, the second transmission antenna 702, the fourth transmission antenna 704, and the third transmission antenna 703.

The transmission antennas 701, 702, 703, and 704 transmit a whole signal 730 by respectively transmitting signals 731, 732, 733, and 734 at times or turns being assigned respectively to the transmission antennas 701, 702, 703, and 704. The transmitted signals 731, 732, 733, and 734 are all the same transmitted signals. For example, the transmitted signals 731, 732, 733, and 734 each are an FMCW signal having a frequency bandwidth of "a" to "b". An intermediate frequency of the transmitted signal is 77 GHz.

Figure 8:
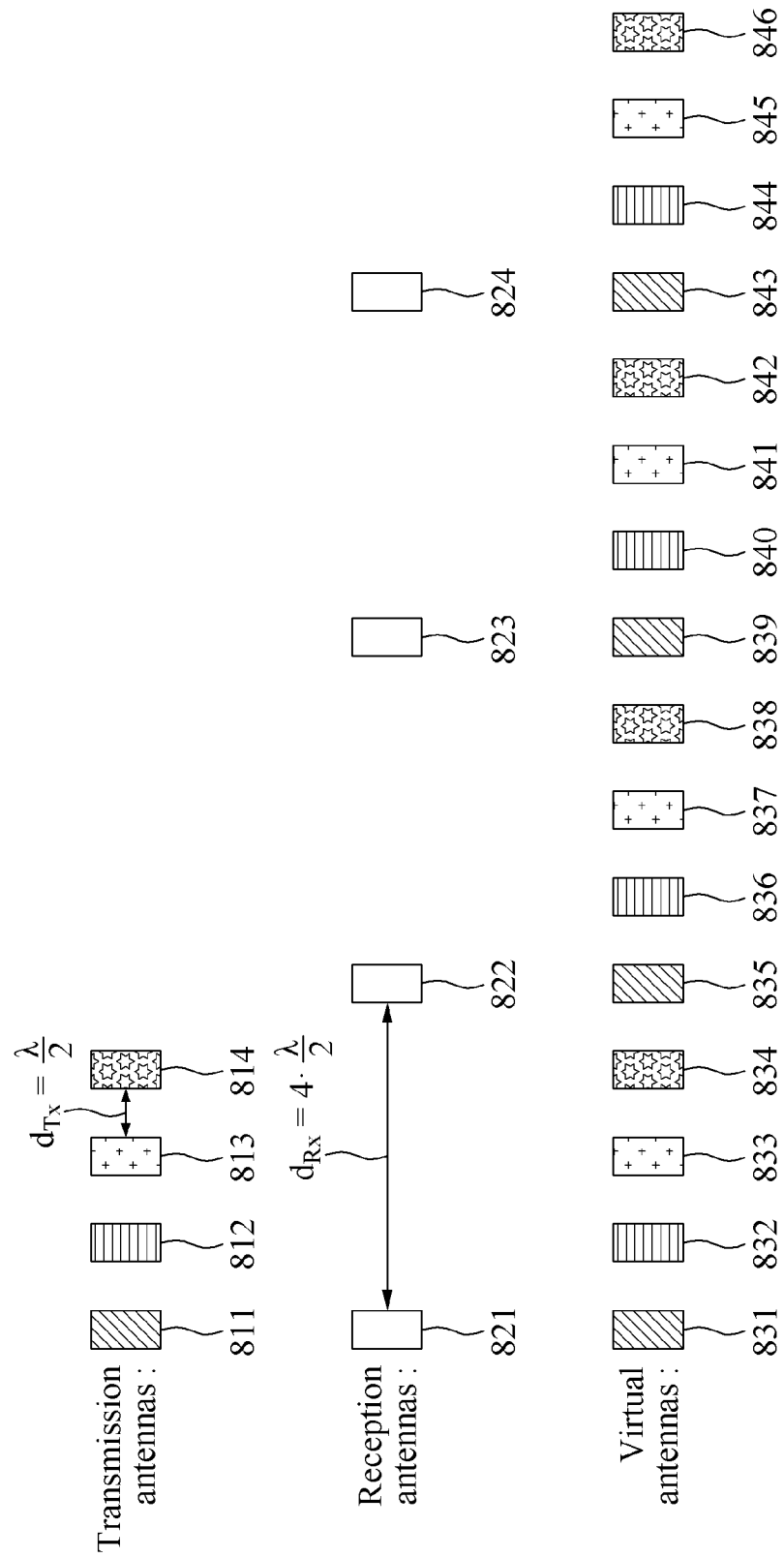
FIG. 8 illustrates an example of virtual antennas generated using an interleaved scheme.

FIG. 8 illustrates an example of virtual antennas generated using an interleaved scheme.

When a distance $d_{Tx}$ between each two of transmission antennas 811, 812, 813, and 814 is less than a distance $d_{Rx}$ between each two of reception antennas 821, 822, 823, and 824, virtual antennas 831 through 846 are generated using an interleaved scheme.

For example, virtual signals of the virtual antennas 831 through 834 are generated based on information regarding that the reception antenna 821 receives reflected signals with respect to signals transmitted by the transmission antennas 811 through 814. The virtual antennas 835 through 838 correspond to the transmission antennas 811 through 814 and the reception antenna 822, the virtual antennas 839 through 842 correspond to the transmission antennas 811 through 814 and the reception antenna 823, and the virtual antennas 843 through 846 correspond to the transmission antennas 811 through 814 and the reception antenna 824.

Figure 9:
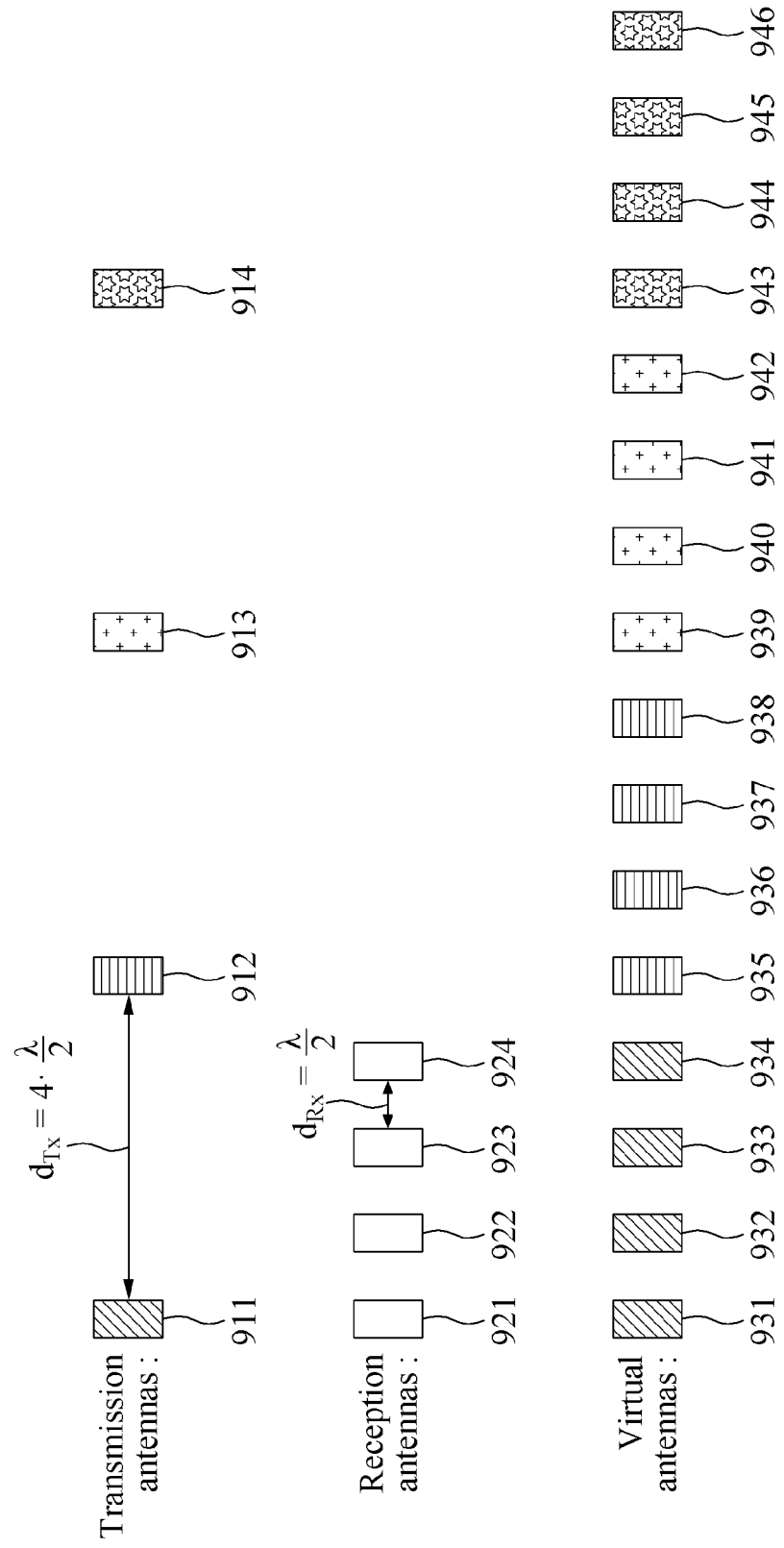
FIG. 9 illustrates an example of virtual antennas generated using a serialized scheme.

FIG. 9 illustrates an example of virtual antennas generated using a serialized scheme.

If a distance $d_{Tx}$ between each two of transmission antennas 911, 912, 913, and 914 is greater than a distance $d_{Rx}$ between each two of reception antennas 921, 922, 923, and 924, virtual antennas 931 through 946 are generated using a serialized scheme.

For example, virtual signals of the virtual antennas 931 through 934 are generated based on information regarding that the reception antennas 921 through 924 receive a reflected signal with respect to a signal transmitted by the transmission antenna 911. The virtual antennas 935 through 938 correspond to the transmission antenna 912 and the reception antennas 921 through 924, the virtual antennas 939 through 942 correspond to the transmission antenna 913 and the reception antennas 921 through 924, and the virtual antennas 943 through 946 correspond to the transmission antenna 914 and the reception antennas 921 through 924.

Figure 10:
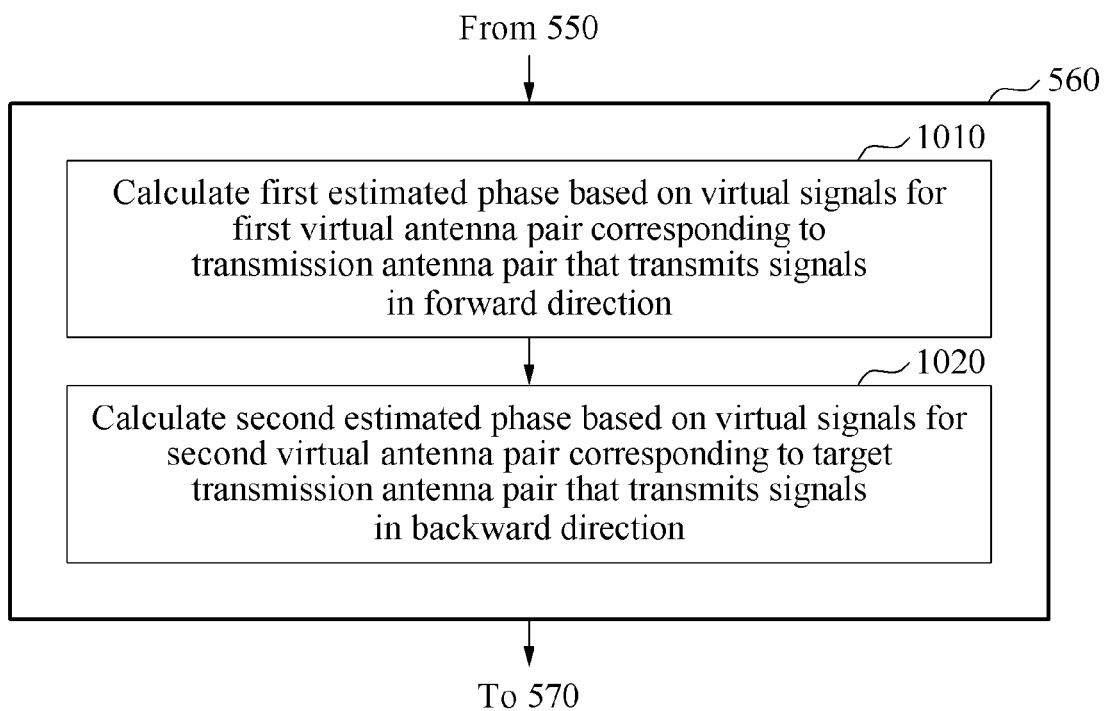
FIG. 10 illustrates an example of calculating a first estimated phase and a second estimated phase which are different from each other based on virtual signals.

FIG. 10 illustrates an example of calculating a first estimated phase and a second estimated phase that is different from each other based on virtual signals. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. One or more blocks of FIG. 10, and combinations of the blocks, can be implemented by special purpose hardware-based computer that perform the specified functions, or combinations of special purpose hardware and computer instructions. In addition to the description of FIG. 10 below, the descriptions of FIGS. 1-9 are also applicable to FIG. 10, and are incorporated herein by reference. Thus, the above description may not be repeated here.

Referring to FIG. 10, operation 560 of FIG. 5 includes operations 1010 and 1020.

In operation 1010, the electronic device 400 calculates a first estimated phase based on virtual signals for a first virtual antenna pair corresponding to a transmission antenna pair that transmits signals in a forward direction.

In the example of FIG. 8, the transmission antenna pair which transmits the signals in the forward direction includes the transmission antennas 811 and 812. The first virtual antenna pair corresponding to the transmission antenna pair includes the virtual antennas 831 and 832. The first estimated phase is calculated based on virtual signals generated with respect to the virtual antennas 831 and 832. For example, by generating a differential signal through differential encoding of the generated virtual signals and extracting a phase of the differential signal, the first estimated phase is calculated. The differential signal is generated using Equation 1.

$$w(n_t,n_r) = r_{n_t+1,n_r} \cdot r^*_{n_t,n_r} \qquad \text{[Equation 1]}$$

In Equation 1, $n_t$ denotes an index of a transmission antenna, wherein the index is an even number less than the total number $N_t$ of transmission antennas. $n_r$ denotes an index of a reception antenna, wherein the index has a range of $0 \leq n_r \leq N_r$. $N_r$ denotes the total number of reception antennas. $r_{n_t,n_r}$ denotes a signal transmitted by the transmission antenna with the index $n_t$ and received by the reception antenna with the index $n_r$.

In operation 1020, the electronic device 400 calculates a second estimated phase based on virtual signals for a second virtual antenna pair corresponding to a transmission antenna pair that transmits signals in a backward direction.

In the example of FIG. 8, the transmission antenna pair which transmits the signals in the backward direction includes the transmission antennas 813 and 814. The second virtual antenna pair corresponding to the transmission antenna pair includes the virtual antennas 833 and 834. The second estimated phase is calculated based on virtual signals generated with respect to the virtual antennas 833 and 834. For example, by generating a differential signal through differential encoding of the generated virtual signals and extracting a phase of the differential signal, the second estimated phase is calculated.

Figure 11:
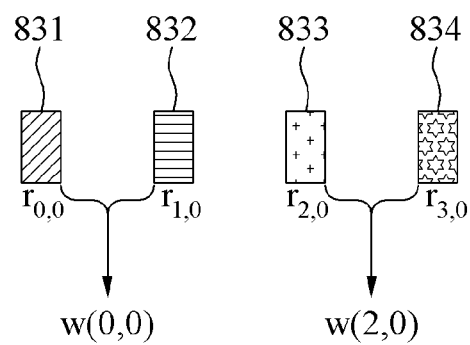
FIG. 11 illustrates an example of a first differential signal and a second differential signal calculated based on virtual antennas generated using an interleaved scheme.

FIG. 11 illustrates an example of a first differential signal and a second differential signal calculated based on virtual antennas generated using an interleaved scheme.

According to the examples of FIGS. 8 and 10, w(0,0) is calculated as the first differential signal based on the virtual signals with respect to the virtual antennas 831 and 832 of the first virtual antenna pair. w(2,0) is calculated as the second differential signal based on the virtual signals with respect to the virtual antennas 833 and 834 of the second virtual antenna pair.

In the interleaved scheme, the first estimated phase calculated based on the first differential signal is expressed by Equation 2, and the second estimated phase calculated based on the second differential signal is expressed by Equation 3.

$$\varphi_{est,1} = \pi \cdot \sin(\theta) + 2\pi \cdot f_D T_{chirp} \qquad \text{[Equation 2]}$$

$$\varphi_{est,2} = \pi \cdot \sin(\theta) + 2\pi \cdot f_D T_{chirp} \qquad \text{[Equation 3]}$$

In Equation 2 and Equation 3, $f_D$ denotes an amount of a Doppler frequency shift, and $T_{chirp}$ denotes a length of a single transmitted signal. Since a signal transmission order of the transmission antenna 813 and the transmission antenna 814 as a target transmission antenna pair is a backward direction, the second estimated phase calculated based on the second differential signal has a portion represented with a negative sign.

Although not shown herein, a calculation similar to that of the interleaved scheme is performed in the serialized scheme. In the serialized scheme, the first estimated phase calculated based on the first differential signal is as expressed by Equation 4, and the second estimated phase calculated based on the second differential signal is as expressed by Equation 5.

$$\varphi_{est,1} = N_T \cdot \pi \cdot \sin(\theta) + 2\pi \cdot f_D T_{chirp} \qquad \text{[Equation 4]}$$

$$\varphi_{est,2} = N_T \cdot \pi \cdot \sin(\theta) - 2\pi \cdot f_D T_{chirp} \qquad \text{[Equation 5]}$$

In Equation 4 and Equation 5, $N_T$ denotes the total number of transmission antennas.

Figure 12:
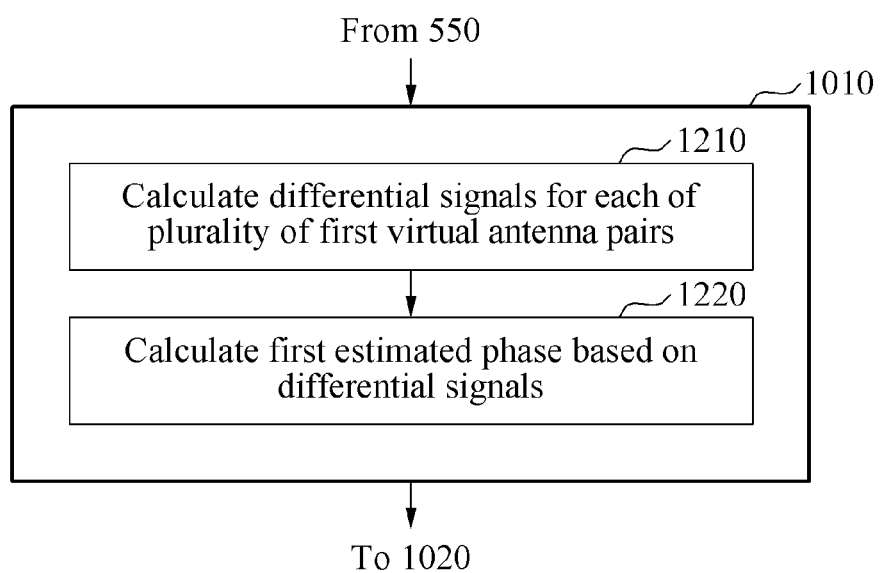
FIG. 12 illustrates an example of calculating a first estimated phase based on estimated phases calculated with respect to first virtual antenna pairs.

FIG. 12 illustrates an example of calculating a first estimated phase based on estimated phases calculated with respect to a plurality of first virtual antenna pairs. The operations in FIG. 12 may be performed in the sequence and manner as shown, although the order of some operations may be changed or some of the operations omitted without departing from the spirit and scope of the illustrative examples described. Many of the operations shown in FIG. 12 may be performed in parallel or concurrently. One or more blocks of FIG. 12, and combinations of the blocks, can be implemented by special purpose hardware-based computer that perform the specified functions, or combinations of special purpose hardware and computer instructions. In addition to the description of FIG. 12 below, the descriptions of FIGS. 1-11 are also applicable to FIG. 12, and are incorporated herein by reference. Thus, the above description may not be repeated here Referring to FIG. 12, operation 1010 of FIG. 10 includes operations 1210 and 1220.

In operation 1210, the electronic device 400 calculates differential signals for each of a plurality of first virtual antenna pairs. The plurality of first virtual antenna pairs corresponds to transmission antenna pairs which transmit signals in a forward direction. The plurality of first virtual antenna pairs will be described further below with reference to FIGS. 13 and 14.

In operation 1220, the electronic device 400 calculates the first estimated phase based on the differential signals. For example, a mean differential phase with respect to differential phases is calculated, and the first estimated phase is calculated from the mean differential phase. A reliability of a result calculated using a mean value of multiple differential phases increases.

Figure 13:
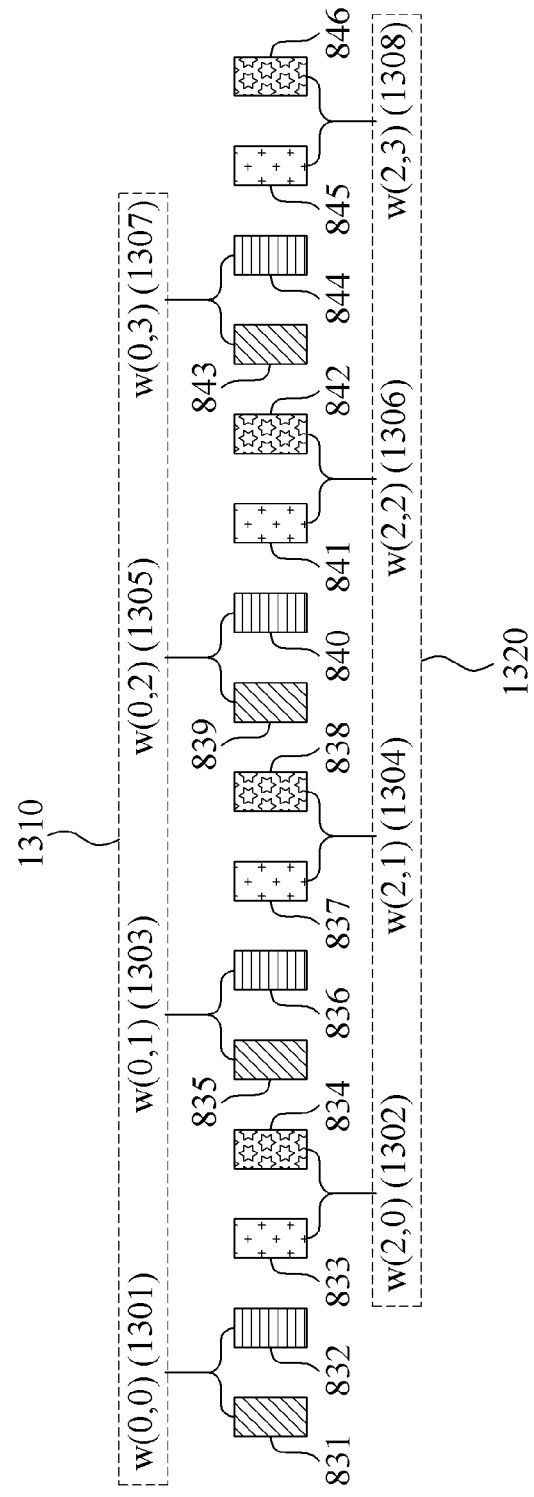
FIG. 13 illustrates an example of calculating a first estimated phase and a second estimated phase based on virtual antennas generated using an interleaved scheme.

FIG. 13 illustrates an example of calculating a first estimated phase and a second estimated phase based on virtual antennas generated using an interleaved scheme.

A plurality of first virtual antenna pairs (831 and 832, 835 and 836, 839 and 840, 843 and 844) correspond to a pair of the transmission antennas 811 and 812, which transmit signals in a forward direction. A plurality of second virtual antenna pairs (833 and 834, 837 and 838, 841 and 842, 845 and 846) correspond to a pair of the transmission antennas 813 and 814, which transmit signals in a backward direction.

With respect to the plurality of first virtual antenna pairs, a first differential signal 1301, a third differential signal 1303, a fifth differential signal 1305, and a seventh differential signal 1307 are calculated. The first differential signal 1301, the third differential signal 1303, the fifth differential signal 1305, and the seventh differential signal 1307 belong to a first group 1310. A first estimated phase is calculated based on the differential signals 1301, 1303, 1305, and 1307 in the first group 1310.

With respect to the plurality of second virtual antenna pairs, a second differential signal 1302, a fourth differential signal 1304, a sixth differential signal 1306, and an eighth differential signal 1306 are calculated. The second differential signal 1302, the fourth differential signal 1304, the sixth differential signal 1306, and the eighth differential signal 1306 belong to a second group 1320. A second estimated phase is calculated based on the differential signals 1302, 1304, 1306, and 1308 in the second group 1320.

Figure 14:
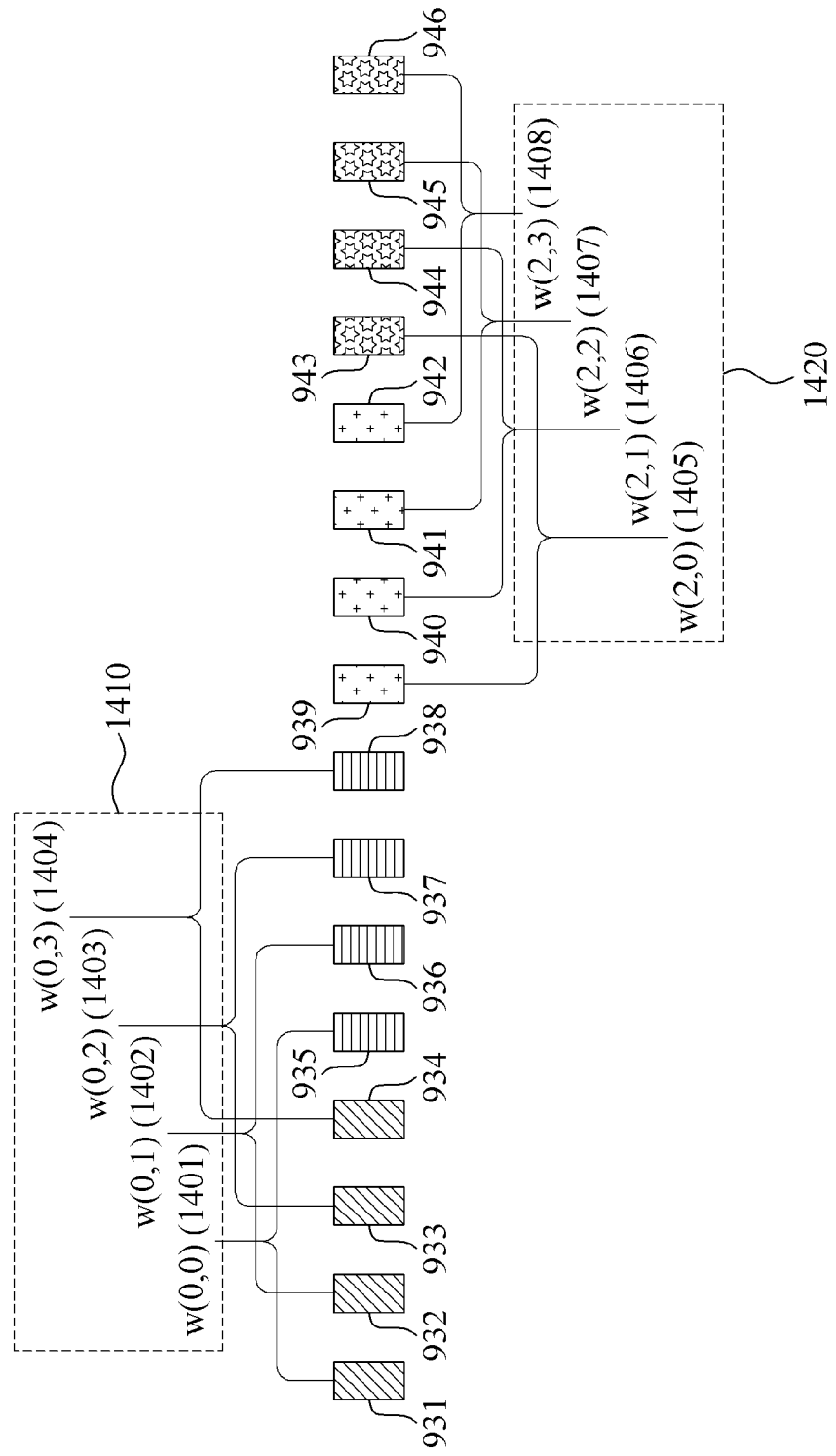
FIG. 14 illustrates an example of calculating a first estimated phase and a second estimated phase based on virtual antennas generated using a serialized scheme.

FIG. 14 illustrates an example of calculating a first estimated phase and a second estimated phase based on virtual antennas generated using a serialized scheme.

A plurality of first virtual antenna pairs (931 and 935, 932 and 936, 933 and 937, 934 and 938) corresponds to a pair of the transmission antennas 911 and 912, which transmit signals in a forward direction. A plurality of second virtual antenna pairs (939 and 943, 940 and 944, 941 and 945, 942 and 946) corresponds to a pair of the transmission antennas 913 and 914, which transmit signals in a backward direction.

With respect to the plurality of first virtual antenna pairs, a first differential signal 1401, a second differential signal 1402, a third differential signal 1403, and a fourth differential signal 1404 are calculated. The first differential signal 1401, the second differential signal 1402, the third differential signal 1403, and the fourth differential signal 1404 belong to a first group 1410. A first estimated phase is calculated based on the differential signals 1401, 1402, 1403, and 1404 in the first group 1410.

With respect to the plurality of second virtual antenna pairs, a fifth differential signal 1405, a sixth differential signal 1406, a seventh differential signal 1407, and an eighth differential signal 1408 are calculated. The fifth differential signal 1405, the sixth differential signal 1406, the seventh differential signal 1407, and the eighth differential signal 1408 belong to a second group 1420. A second estimated phase is calculated based on the differential signals 1405, 1406, 1407, and 1408 in the second group 1420.

Figure 15:
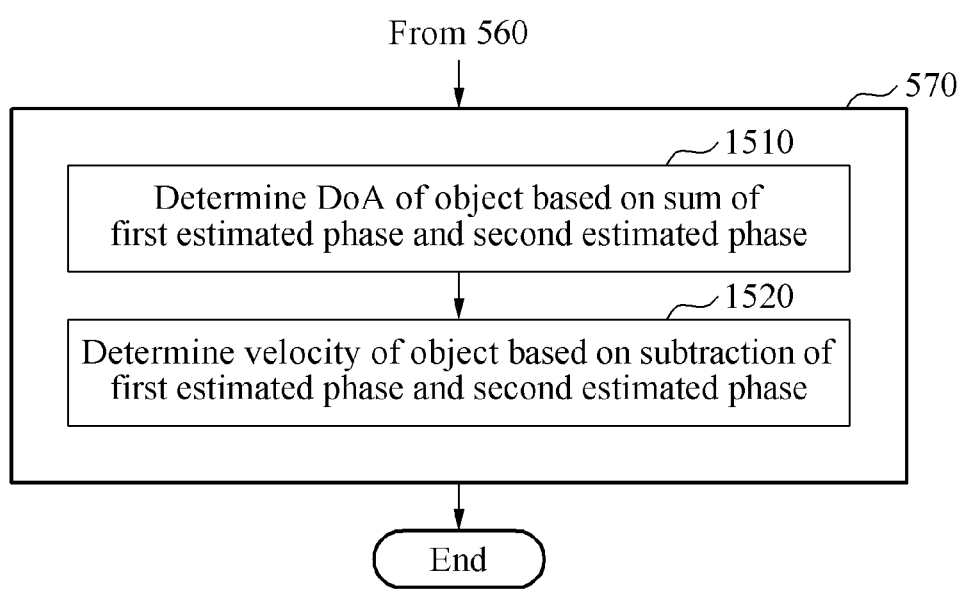
FIG. 15 illustrates an example of determining a direction of arrival (DoA) and a velocity of an object based on a first estimated phase and a second estimated phase.

FIG. 15 illustrates an example of determining a DoA and a velocity of an object based on a first estimated phase and a second estimated phase. The operations in FIG. 15 may be performed in the sequence and manner as shown, although the order of some operations may be changed or some of the operations omitted without departing from the spirit and scope of the illustrative examples described. Many of the operations shown in FIG. 15 may be performed in parallel or concurrently. One or more blocks of FIG. 15, and combinations of the blocks, can be implemented by special purpose hardware-based computer that perform the specified functions, or combinations of special purpose hardware and computer instructions. In addition to the description of FIG. 15 below, the descriptions of FIGS. 1-14 are also applicable to FIG. 15, and are incorporated herein by reference. Thus, the above description may not be repeated here Referring to FIG. 15, operation 570 of FIG. 5 includes operations 1510 and 1520.

In operation 1510, the electronic device 400 determines the DoA of the object based on a sum of the first estimated phase and the second estimated phase. When the first estimated phase and the second estimated phase are added together, portions with respect to the amount of the Doppler frequency shift are offset. Accordingly, the DoA of the object is calculated using Equation 6 in the case of interleaved scheme, and is calculated using Equation 7 in the case of serialized scheme.

$$\theta_{est} = \sin^{-1}\left(\frac{\varphi_{est,1} + \varphi_{est,2}}{2\pi}\right) \quad \text{[Equation 6]}$$

$$\theta_{est} = \sin^{-1}\left(\frac{\varphi_{est,1} + \varphi_{est,2}}{2\pi + N_T}\right) \quad \text{[Equation 7]}$$

In operation 1520, the electronic device 400 determines the velocity of the object based on a subtraction of the first estimated phase and the second estimated phase. When the subtraction of the first estimated phase and the second estimated phase is calculated, portions with respect to the DoA of the object are offset, and only portions with respect to the amount of the Doppler frequency shift remain. The velocity of the object is calculated based on the amount of the Doppler frequency shift. An example of calculating the velocity of the object will be described further with reference to FIG. 16.

Figure 16:
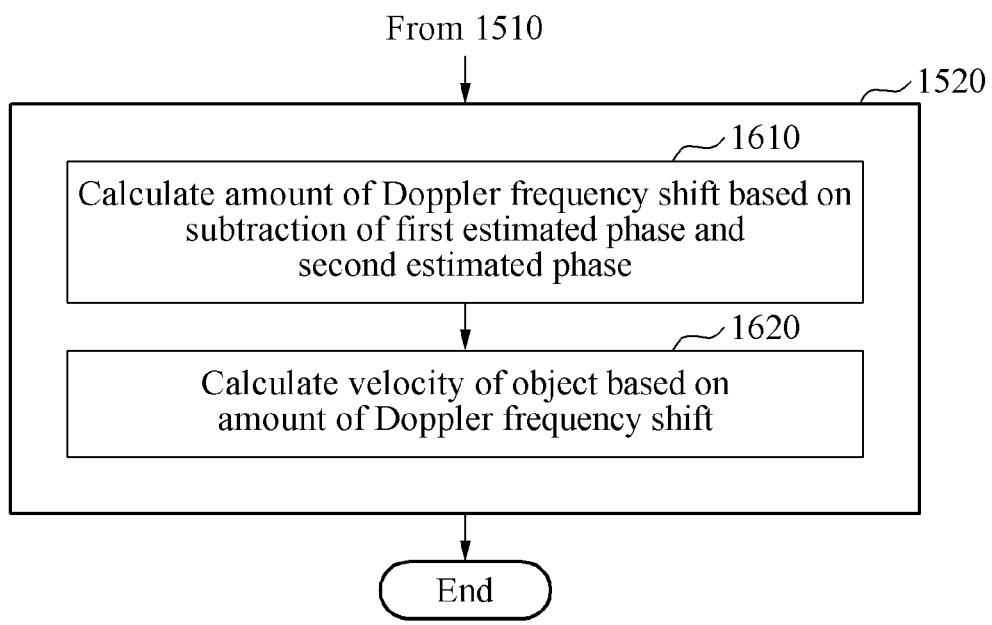
FIG. 16 illustrates an example of calculating a velocity of an object.

FIG. 16 illustrates an example of calculating a velocity of an object. The operations in FIG. 16 may be performed in the sequence and manner as shown, although the order of some operations may be changed or some of the operations omitted without departing from the spirit and scope of the illustrative examples described. Many of the operations shown in FIG. 16 may be performed in parallel or concurrently. One or more blocks of FIG. 16, and combinations of the blocks, can be implemented by special purpose hardware-based computer that perform the specified functions, or combinations of special purpose hardware and computer instructions. In addition to the description of FIG. 16 below, the descriptions of FIGS. 1-15 are also applicable to FIG. 16, and are incorporated herein by reference. Thus, the above description may not be repeated here Referring to FIG. 16, operation 1520 of FIG. 15 includes operations 1610 and 1620.

In operation 1610, the electronic device 400 calculates an amount of a Doppler frequency shift based on the subtraction of the first estimated phase and the second estimated phase. The amount of the Doppler frequency shift is calculated using Equation 8 in the case of interleaved scheme, and is calculated using Equation 9 in the case of serialized scheme.

$$f_{D,est} = \frac{\varphi_{est,1} - \varphi_{est,2}}{4\pi \cdot T_{chirp}} \quad \text{[Equation 8]}$$

$$f_{D,est} = \frac{\varphi_{est,1} - \varphi_{est,2}}{4\pi \cdot T_{chirp}} \quad \text{[Equation 9]}$$

In operation 1620, the electronic device 400 calculates the velocity of the object based on the amount of the Doppler frequency shift. The velocity of the object is calculated using Equation 10.

$$v = \frac{\lambda \times f_D}{2 \times \cos(\theta)} \quad \text{[Equation 10]}$$

Figure 17:
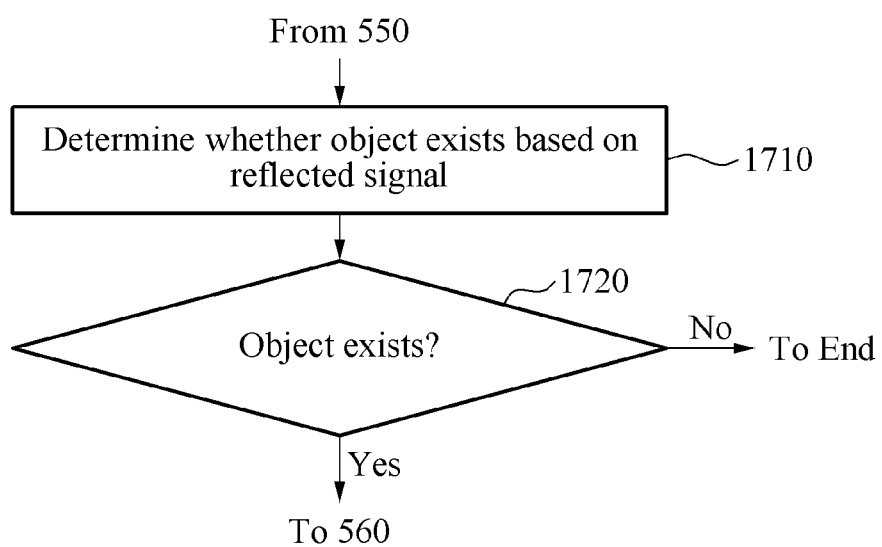
FIGS. 17 and 18 illustrate an example of determining whether an object exists based on a reflected signal.
Figure 18:
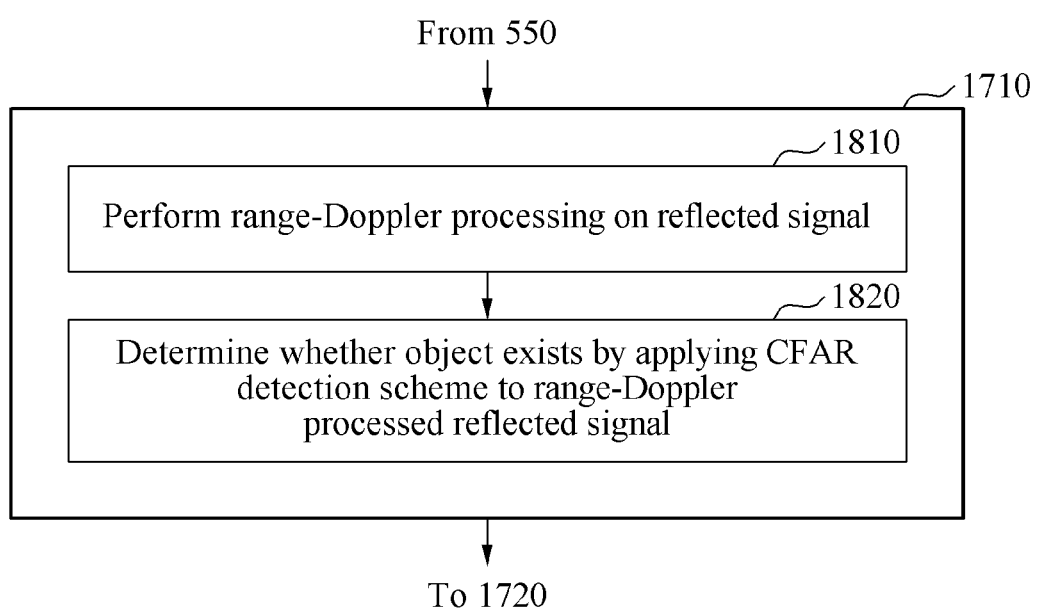

FIGS. 17 and 18 illustrate an example of determining whether an object exists based on a reflected signal. The operations in FIGS. 17 and 18 may be performed in the sequence and manner as shown, although the order of some operations may be changed or some of the operations omitted without departing from the spirit and scope of the illustrative examples described. In an example, before operation 560 of FIG. 5 is performed, operations 1710 and 1720 are performed. Many of the operations shown in FIGS. 17 and 18 may be performed in parallel or concurrently. One or more blocks of FIGS. 17 and 18, and combinations of the blocks, can be implemented by special purpose hardware-based computer that perform the specified functions, or combinations of special purpose hardware and computer instructions. In addition to the description of FIGS. 17 and 18 below, the descriptions of FIGS. 1-16 are also applicable to FIGS. 17 and 18, and are incorporated herein by reference. Thus, the above description may not be repeated here.

In operation 1710, the electronic device 400 determines whether an object exists based on the reflected signal. Operation 1710 includes operations 1810 and 1820 of FIG.

18. In operation 1810, the electronic device 400 performs range-Doppler processing on the reflected signal. In operation 1820, the electronic device 400 determines whether an object exists by applying a constant false alarm rate (CFAR) detection scheme to the range-Doppler processed reflected signal.

In operation 1720, when it is determined that an object exists, operation 560 is performed. If it is determined that an object does not exist, there is no need to determine the velocity and the DoA of the object, and thus operation 560 is not performed.

Figure 19:
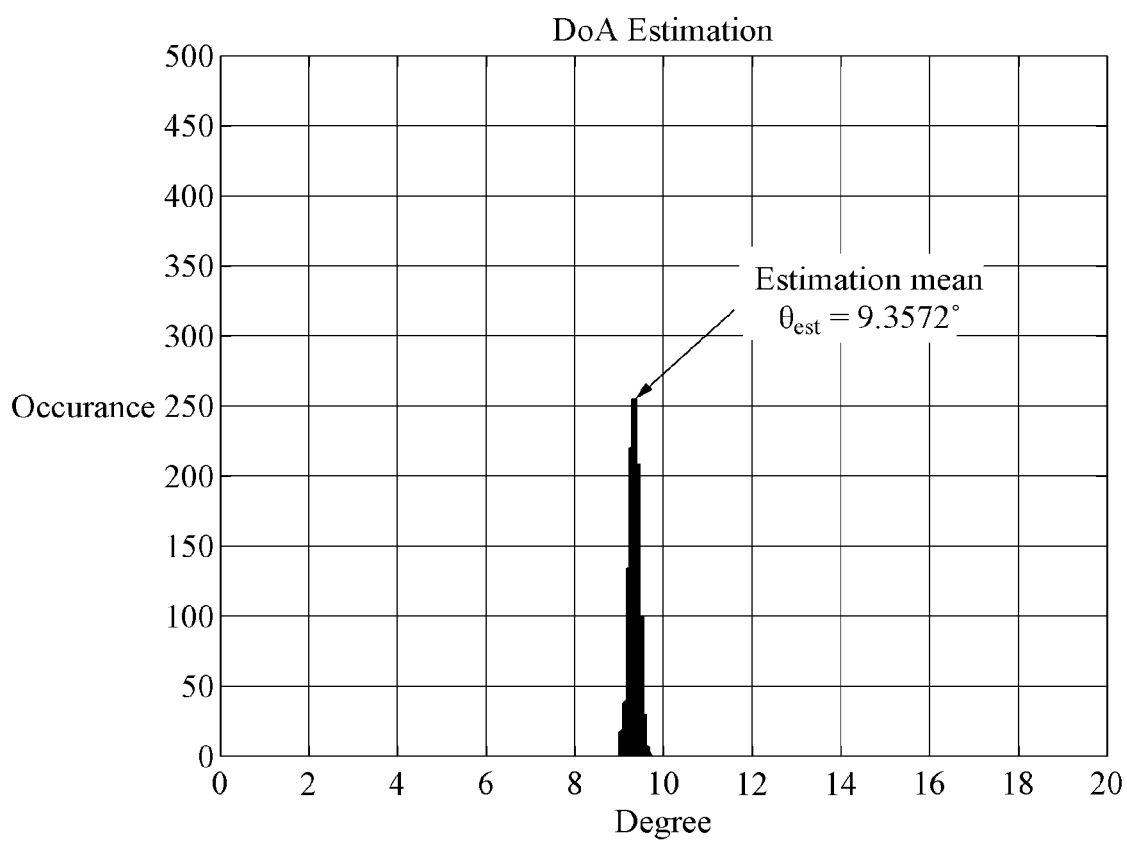
FIG. 19 illustrates an example of an accuracy of a determined DoA of an object.

FIG. 19 illustrates an example of an accuracy of a determined DoA of an object.

FIG. 19 shows a DoA of an object determined through operations 510 through 570 of FIG. 5. Since a real DoA of an object is 10 degrees relative to a front face of a radar, the mean DoA of the object is determined to be 9.3572 degrees, which is evaluated as a relatively small error.

Figure 20:
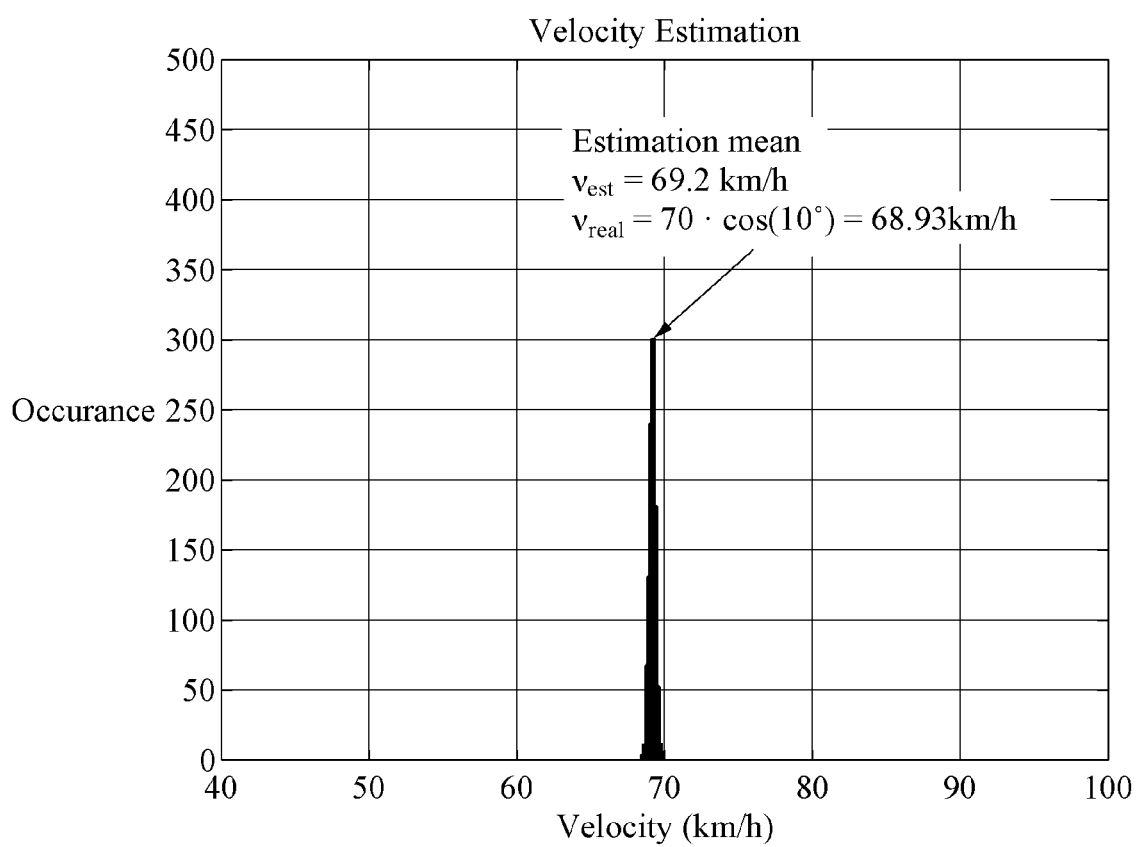
FIG. 20 illustrates an example of an accuracy of a determined velocity of an object.

FIG. 20 illustrates an example of an accuracy of a determined velocity of an object.

FIG. 20 shows a velocity of an object determined through operations 510 through 570 of FIG. 5. A real velocity of an object is 70 km/h in a DoA of 10 degrees relative to a front face of a radar. That is, the velocity of the object is 68.93 km/h. The mean velocity of the object is determined to be 69.2 km/h, which is evaluated as a relatively small error.

The electronic device 400, communicator 410, and other apparatuses, units, modules, devices, and other components described herein with respect to FIGS. 1-20 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-20 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD- Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory, such as, a multimedia card, a secure digital (SD) or a extreme digital (XD), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the the disclosure.

What is claimed is:

1. A method for determining a state of an object performed by an electronic device comprising at least first, second, third, and fourth transmission antennas of a plurality of transmission antennas, the method comprising:
    transmitting, as a forward transmission order, a first signal through the first transmission antenna and a subsequent second signal through the second transmission antenna, where the first transmission antenna is physically arranged before the second transmission antenna with respect to a reference arrangement of the plurality of the transmission antennas;
    transmitting, as a backward transmission order, a fourth signal through the fourth transmission antenna and a subsequent third signal through the third transmission antenna, where the third transmission antenna is physically arranged before the fourth transmission antenna with respect to the reference arrangement of the plurality of transmission antenna;
    receiving, using at least one reception antenna, a first reflected signal with respect to the transmitted first signal, a second reflected signal with respect to the transmitted second signal, a third reflected signal with respect to the transmitted third signal, and a fourth reflected signal with respect to the transmitted fourth signal;
    determining a first estimated phase based on the first reflected signal and the second reflected signal;
    determining a second estimated phase based on the third reflected signal and the fourth reflected signal; and
    determining, based on the first estimated phase and the second estimated phase, a velocity of the object.

2. The method of claim 1, wherein the first transmitted signal is a frequency modulated continuous wave (FMCW) type signal or a chirp type signal, the second signal is the FMCW type signal or the chirp type signal, the third signal is the FMCW type signal or the chirp type signal, and the fourth signal is the FMCW type signal or the chirp type signal.

3. The method of claim 1, further comprising:
    determining whether the object exists based on the first, second, third, and fourth reflected signals,
    wherein the first estimated phase and the second estimated phase are calculated in response to a result of the determining of whether the object exists being that the object exists.

4. The method of claim 3, wherein the determining of whether the object exists comprises:
    performing respective range-Doppler processing on the first, second, third, and fourth reflected signals; and
    determining whether the object exists by respectively applying a constant false alarm rate (CFAR) detection scheme to the range-Doppler processed first, second, third, and fourth reflected signals.

5. The method of claim 1, wherein the velocity of the object is based on a difference between the first estimated phase and the second estimated phase.

6. The method of claim 5, wherein the determining of the velocity of the object comprises:
    determining an amount of a Doppler frequency shift based on the difference between the first estimated phase and the second estimated phase; and
    determining the velocity of the object based on the determined amount of the Doppler frequency shift.

7. The method of claim 1, further comprising executing, by one or more processors, instructions stored in a non-transitory computer-readable storage medium to configure the one or more processors to control respective performances of the transmitting of the first and second signals, the transmitting of the third and fourth signals, the receiving of the first through fourth reflected signals, the determining of the first estimated phase, the determining of the second estimated phase, and the determining of the velocity of the object.

8. The method of claim 1, wherein the first estimated phase and the second estimated phase have offsetting Doppler frequency shifts.

9. The method of claim 1, wherein the determining of the second estimated phase includes consideration of an oppositively signed doppler frequency shift component than a signed doppler frequency shift component considered in the determining of the first estimated phase.

10. The method of claim 1, further comprising:
generating virtual antennas based on the reference arrangement of the plurality of transmission antennas and an arrangement of the at least one reception antenna, or based on an arrangement of the first through fourth transmission antennas and the arrangement of the at least one reception antenna.

11. The method of claim 10, wherein the generating of the virtual antennas comprises:
determining a first arrangement of first virtual antennas based on a first distance between the first and second transmission antennas, and/or a second arrangement of second virtual antennas based on a second distance between the third and fourth transmission antennas; and
generating the virtual antennas based on the determined first arrangement of the first virtual antennas and/or the determined first arrangement of the second virtual antennas.

12. The method of claim 10, wherein the determining of the first estimated phase comprises:
generating differential signals with respect to a plurality of first virtual antenna pairs, wherein the plurality of first virtual antenna pairs correspond to transmission antenna pairs, including a transmission antenna pair of the first and second transmission antennas, transmitting signals in the forward transmission order; and
determining the first estimated phase based on the differential signals.

13. The method of claim 1, further comprising:
generating, respectively based on the first, second, third, and fourth reflected signals and generated virtual antennas, corresponding first, second, third, and fourth virtual signals, including generating at least one virtual antenna based on the reference arrangement of the plurality of transmission antennas and an arrangement of the at least one reception antenna.

14. The method of claim 13, wherein the determining the first estimated phase based on the first reflected signal and the second reflected signal comprises:
determining the first estimated phase based on the first virtual signal and second virtual signal.

15. The method of claim 13, wherein the determining the second estimated phase based on the third reflected signal and the fourth reflected signal comprises:
determining the second estimated phase based on the third virtual signal and fourth virtual signal.

16. The method of claim 1, further comprising:
determining, with respect to the object, a direction of arrival (DoA) based on the first estimated phase and the second estimated phase.

17. The method of claim 16, wherein the determining of the DoA is based on a sum of the first estimated phase and the second estimated phase.

18. A device for determining a state of an object based on at least first, second, third, and fourth transmission antennas of a plurality of transmission antennas, the device comprising:
one or more processors configured to:
transmit, as a forward transmission order, a first signal through the first transmission antenna and a subsequent second signal through the second transmission antenna, where the first transmission antenna is physically arranged before the second transmission antenna with respect to a reference arrangement of the plurality of transmission antennas;
transmit, as a backward transmission order, a fourth signal through the fourth transmission antenna and subsequent third signal through the third transmission antenna, where the third transmission antenna is physically arranged before the fourth transmission antenna with respect to the reference arrangement of the plurality of transmission antenna;
receive, using at least one reception antenna, a first reflected signal with respect to the transmitted first signal, a second reflected signal with respect to the transmitted second signal, a third reflected signal with respect to the transmitted third signal, and a fourth reflected signal with respect to the transmitted fourth signal;
determine a first estimated phase based on the first reflected signal and the second reflected signal;
determine a second estimated phase based on the third reflected signal and the fourth reflected signal; and
determine, based on the first estimated phase and the second estimated phase, a velocity of the object.

19. The device of claim 13, wherein the processor is further configured to determine whether the object exists based on the first, second, third, and fourth reflected signals,
wherein the first estimated phase and the second estimated phase are determined in response to a result of the determining of whether the object exists being that the object exists.

20. The device of claim 18, wherein the processor is further configured to:
determine a first arrangement of first virtual antennas based on a distance between the first and second transmission antennas and a distance between the first and second reception antennas, and/or determine a second arrangement of second virtual antennas based on a distance between the third and fourth transmission antennas and a distance between third and fourth reception antennas; and
generate the virtual antennas based on the determined first arrangement of the first virtual antennas and/or based on the determined second arrangement of the second virtual antennas.

21. The device of claim 18, further comprising a memory storing instructions that, when executed, configures the one or more processors to control respective performances of the transmission of the first and second signals, the transmission of the third and fourth signals, the reception of the first through fourth reflected signals, the determination of the first estimated phase, the determination of the second estimated phase, and the determination of the velocity of the object.

22. An electronic device, comprising:
a radar comprising first, second, third, and fourth transmission antennas, of a plurality of transmission antennas, and reception antennas; and
one or more processors configured to:
transmit, as a forward transmission order, a first signal through the first transmission antenna and a subsequent second signal through the second transmission antenna, where the first transmission antenna is physically arranged before the second transmission antenna with respect to a reference arrangement of the plurality of transmission antennas;
transmit, as a backward transmission order, a fourth signal through the fourth transmission antenna and subsequent third signal through the third transmission antenna, where the third transmission antenna is physically arranged before the fourth transmission antenna with respect to the reference arrangement of the plurality of transmission antennas;

receive, by the reception antennas, a first reflected signal with respect to the transmitted first signal by the first reception antenna, a second reflected signal with respect to the transmitted second signal, a third reflected signal with respect to the transmitted third signal, and a fourth reflected signal with respect to the transmitted fourth signal;

determine a first estimated phase based on the first reflected signal and second reflected signal;

determine a second estimated phase based on the third reflected signal and fourth reflected signal; and determine, based on the first estimated phase and the second estimated phase, a velocity of the object.

\* \* \* \* \*